United States Patent [19]

Troetscher

[11] Patent Number: 4,779,357
[45] Date of Patent: Oct. 25, 1988

[54] APPARATUS FOR BLOWING A TREATMENT MEDIUM ONTO A LONGITUDINALLY MOVING WEB

[75] Inventor: Gerhard Troetscher, Lindau, Fed. Rep. of Germany

[73] Assignee: Lindauer Dornier Gesellschaft mbH, Lindau/Bodensee, Fed. Rep. of Germany

[21] Appl. No.: 73,993

[22] Filed: Jul. 16, 1987

[30] Foreign Application Priority Data

Aug. 1, 1986 [DE] Fed. Rep. of Germany ....... 3626175
Aug. 1, 1986 [DE] Fed. Rep. of Germany ....... 3626171
Dec. 13, 1986 [DE] Fed. Rep. of Germany ....... 3642710

[51] Int. Cl.$^4$ ............................................. F26B 13/00
[52] U.S. Cl. ......................................... 34/155; 34/160
[58] Field of Search .................... 34/160, 54, 155, 156

[56] References Cited

U.S. PATENT DOCUMENTS 2,848,820  8/1958  Wallihi et al. ................. 34/156 X
4,021,931  5/1977  Russ et al. ..................... 34/156
4,058,244  11/1977 Vits ............................... 34/156 X
4,060,914  12/1977 Hoffman ......................... 34/160 X

FOREIGN PATENT DOCUMENTS 1911020  9/1970  Fed. Rep. of Germany .
3007752  9/1981  Fed. Rep. of Germany .

Primary Examiner—Steven E. Warner
Attorney, Agent, or Firm—W. G. Fasse; D. H. Kane, Jr.

[57] ABSTRACT

A treatment medium, such as cooling air, is blown onto the surface of a web moving in a longitudinal direction, with the aid of at least one longitudinal blowing box or so-called nozzle finger extending across the web and having at least one blowing nozzle facing the web. The blowing box is longitudinally separated by a divider wall forming at least a longitudinal nozzle chamber and at least one overflow chamber. Both channels receive treatment medium at the same end of the box. The divider wall has at least one opening through which the two channels communicated with each other at the opposite end of the box. This feature assures a treatment medium distribution in the channel facing the web, as if treatment medium were supplied into the blowing box at both ends. The box may also be divided into two nozzle channels and two overflow channels, whereby two divider walls may extend substantially vertically to form two overflow channels each having a triangular cross-section.

19 Claims, 4 Drawing Sheets

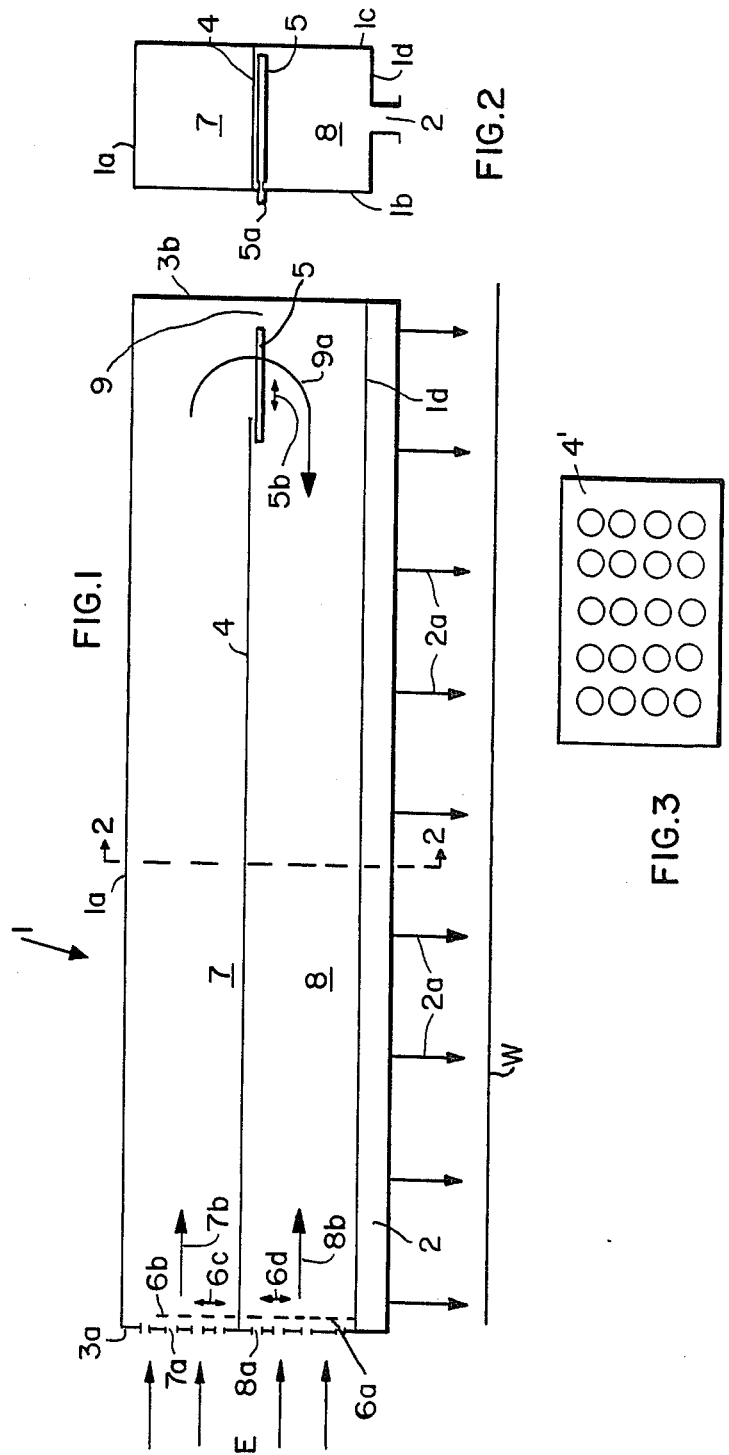

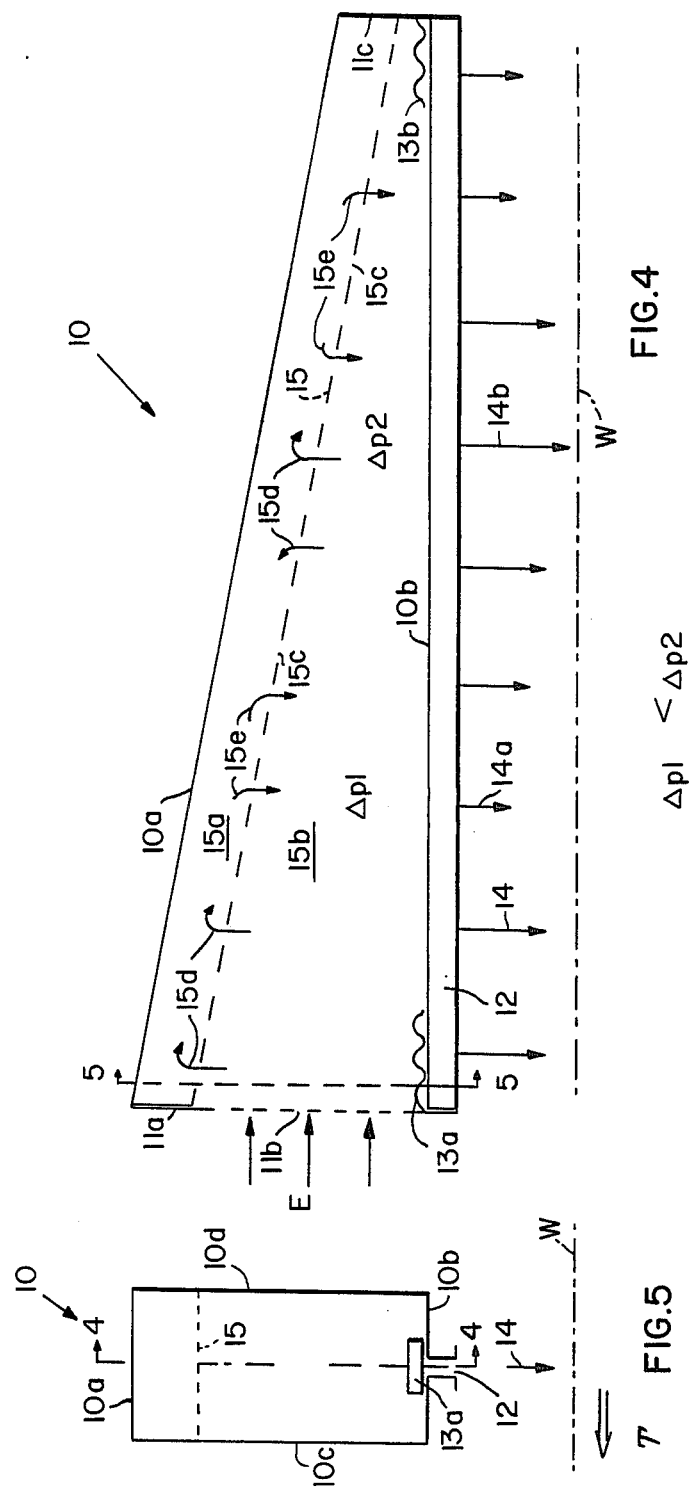

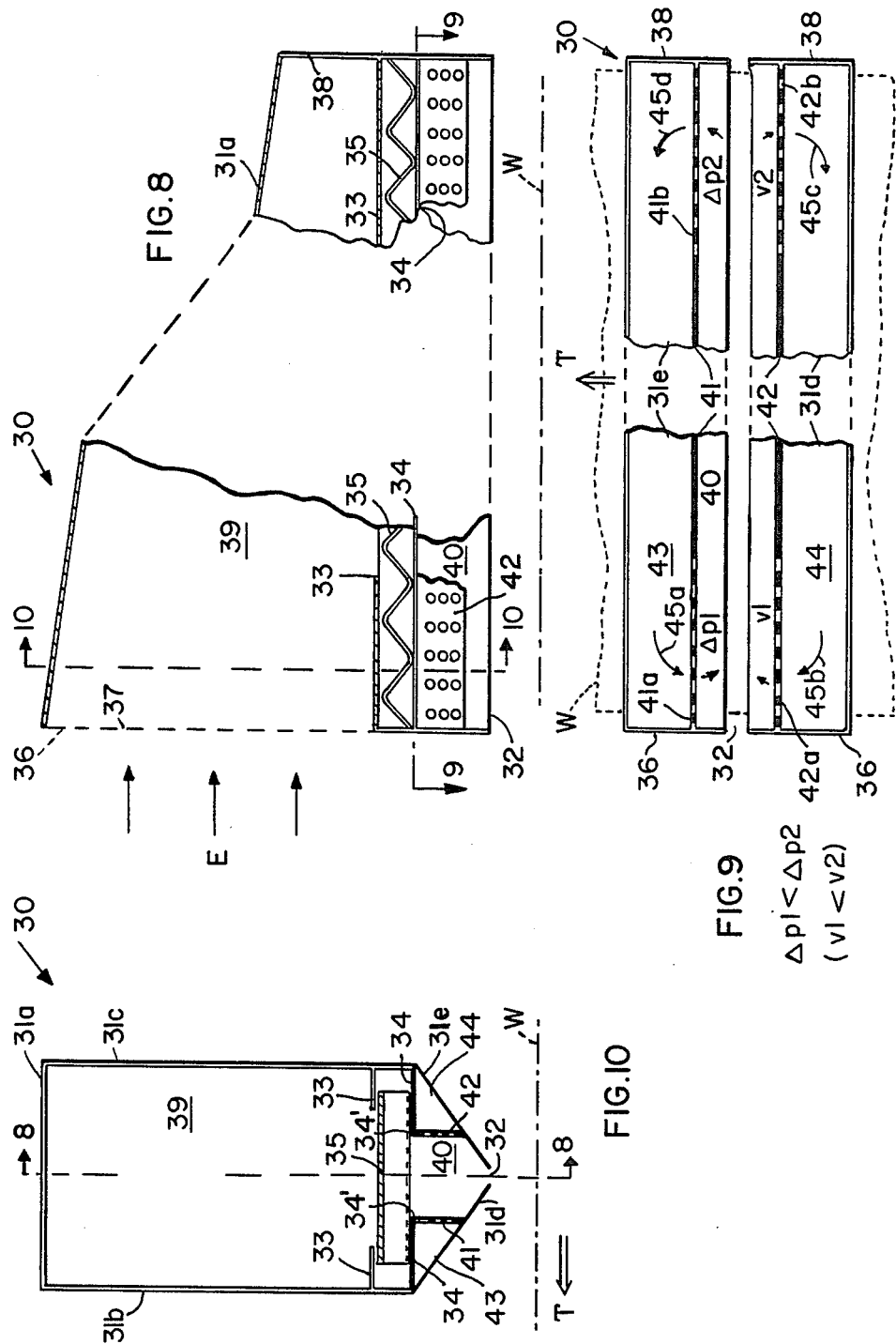

APPARATUS FOR BLOWING A TREATMENT MEDIUM ONTO A LONGITUDINALLY MOVING WEB

FIELD OF THE INVENTION

The invention relates to an apparatus for blowing a treatment medium, especially a gaseous treatment medium, onto a longitudinally moving web, such as a film of plastics material moving through a film stretching machine.

DESCRIPTION OF THE PRIOR ART

Treatment medium blowing boxes of the type mentioned above are known in the art. Such boxes are equipped with a row of nozzles or with one longitudinal slit nozzle facing the web. Usually two boxes are employed, one of which is arranged above the web with the nozzles facing downwardly and the other is arranged below the web with the nozzles facing upwardly. Both boxes extend approximately across the width of the web passing longitudinally through a treatment chamber.

The treatment medium is conventionally introduced into the nozzle or blower boxes by a blower fan connected to one side of the nozzle boxes equipped with slit type nozzle openings extending across the width of the web for blowing the treatment medium onto the surface of the goods such as a web of plastics material or a fabric.

Supplying the gaseous treatment medium to the nozzle boxes from one side of the boxes has the undesirable characteristic that the blowing or treatment medium is not directed out of the nozzles perpendicularly onto the surface of the web, but rather at an angle to the vertical. Another disadvantage is seen in that the blow out velocity of the gaseous jet is non-uniform over the length of the nozzle box. These characteristics are disadvantageous because particularly the heat transfer and thus the desired heat removal are substantially reduced due to the slanted direction of the blowing medium relative to the surface of the web. The non-uniform blowing speed results in a non-uniform cooling effect. Additionally, the slanted blowing direction has a negative effect on the quality of the web material, for example folds or wrinkles may be formed.

It is known to improve the outflow of the treatment medium by means of inserts such as baffle plates, made, for example of corrugated sheet metal, to form flow impeding bodies located close to the blow out nozzles. However, such sheet metal inserts or flow impeding bodies must be constructed in accordance with the requirements of the individual situation, especially with due regard to the nozzle construction and/or with due regard to the nozzle dimensions. Thus, these inserts for guiding the blowing or treatment medium make the respective boxes rather expensive. Besides, these inserts interfer substantially with keeping the treatment blow boxes clean.

The treatment of films or foils of synthetic material has been subject to ever increasing stringent requirements regarding the velocity distribution of the treatment medium flowing out of the nozzles or nozzle, and especially with regard to the flow direction of the medium out of the nozzles relative to the surface of the material to be treated. Thus, in addition to nozzle boxes equipped with treatment medium inlets at one side of the box, boxes have become known into which the treatment medium is introduced at both ends. Such a treatment medium supply into both ends of the nozzle box avoids using the above mentioned inserts and still achieves blow out directions perpendicularly to the surface of the material web and also a satisfactory distribution of the blowing speed throughout the length of the blow or nozzle box. However, for structural reasons it is not always possible to install into certain machines nozzle boxes with a treatment medium supply at both ends.

German Patent Publication (DE-AS) No. 1,911,020 discloses, for example, an apparatus for the heat treatment of a web of goods by means of an air stream. The air stream is guided through aerating boxes or nozzle channels which, depending on their location, are equipped with nozzles. The nozzles are located either in the bottom or downwardly facing side wall or in the top or upwardly facing side wall. The nozzles may be slit nozzles or other aperture type nozzles. The treatment air stream is supplied through one end wall of the nozzle box and control flaps are used for regulating the air flow. The flow cross-sectional area of the nozzle channels can remain the same throughout the length of the nozzle channels from the air inlet end to the free end or, for certain purposes the flow cross-sectional area may diminish from the inlet end toward the free end. In the nozzle boxes or nozzle channels having a uniform cross-sectional flow area through their length, an adjustment flap is provided for each box. The adjustment flap divides the respective nozzle channel into an upper partial space and into a lower partial space or channel. The upper partial space or channel has air exit nozzles facing upwardly while the lower partial space or channel has air exit nozzles facing downwardly. The air adjustment or regulating flap is hinged to a tilting axis mounted approximately in the center of the nozzle channel. This tilting axis extends in parallel to the fabric or film web. This mounting of the tilting axis makes it possible to discharge treatment medium either upwardly or downwardly depending on the instantaneous position of the adjustment flap. When the adjustment flap is in a substantially horizontal position approximately in parallel to the material web, the adjustment flap forms a type of intermediate wall for the nozzle channel, thereby guiding one half of the air stream upwardly to the upwardly directed air discharge nozzles and the other half of the air stream downwardly to the downwardly directed air discharge nozzles. Such a nozzle channel makes it possible to selectively treat the downwardly facing surface of a web travelling above the nozzle channel or to treat the upwardly facing surface of a web travelling below the nozzle channel, or to treat both material webs simultaneously with the air stream.

As mentioned above, nozzle channels, for example in the form of so-called nozzle fingers, which are supplied with the gaseous treatment medium at one end, have the disadvantage that the outflow of the treatment medium through the nozzle openings is not uniform over the length of the blowing nozzles. Neither the outflow speed nor the outflow quantity, nor the outflow direction is uniform over the length of the nozzle or nozzles.

This undesirable non-uniformity cannot be avoided even if the nozzle channels are formed with a slanted side wall so that the flow cross-sectional area of the nozzle channel diminishes from the inlet end toward the free opposite end. Depending on the inflow conditions in the nozzle channel or nozzle finger, and due to the horizontal flow of the gas stream into the nozzle box or by an injector effect, or by eddy currents, further disturbances may be caused in the distribution of the outflow speed throughout the flow of the nozzle.

It is known to alleviate this problem or deficiency to achieve a more uniform distribution of the outflow speed at the nozzles or throughout the nozzle length. It is also known to install baffles into the nozzle channels, for example, in the form of apertured sheet metal members, guide members, or flow impeding components or bodies. However, these improvements of the prior art must be adapted to the individual requirements of any particular situation, especially with due regard to the nozzle construction and/or the nozzle dimensions.

Reference is made in this connection, for example, to German Patent (DE-PS) No. 3,007,752 in which the nozzle fingers are divided into two back-up chambers or spaces one above the other for improving the flow conditions. In such a structure a corrugated sheet metal type cover is provided above the slit nozzle. This cover is partially covered itself along its edge on its upper and lower side by a mounting frame or bracket forming separation walls. Due to the back-up chambers arranged one above the other, and due to the corrugated sheet metal cover, the gas stream is deflected repeatedly prior to its exit through the nozzles, whereby the flow conditions between the upper and lower back-up chamber is stabilized so that the outflow of the treatment medium of the nozzle or nozzles appears to be substantially uniform. However, this type of arrangement still has the disadvantage that it is relatively complicated in its internal structure of the nozzle finger. Further, it is necessary to accommodate the internal structure to the individual requirements or operating conditions that may differ from one case to another. As a result, the outflow conditions are only uniform to a limited extent.

OBJECTS OF THE INVENTION

In view of the foregoing it is the aim of the invention to achieve the following objects singly or in combination:

to construct a nozzle or blow box in such a way that it is possible to introduce the treatment medium at one end of the box while still avoiding the above mentioned coordinated special inserts for the proper distribution of the blowing medium to all nozzles;

to construct the nozzle box with a blowing medium supply at one end thereof in such a way that the treatment medium is directed substantially perpendicularly to the surface of the goods to be treated and so that a uniform speed of the treatment jet or jets is assured throughout the length of the nozzle box;

to make sure that the nozzles can be easily and quickly cleaned;

to provide a flow control of the treatment medium into the box and also inside the box by simpler means than flow baffles; and to assure said uniform jet speed throughout the length of the slit nozzle independently of the dimensions and construction of the slit nozzles.

SUMMARY OF THE INVENTION

The above objects have been achieved according to the invention in a blower nozzle box which is longitudinally separated by a dividing wall into two longitudinal channels, one of which is located above or alongside the other, whereby the treatment medium is supplied simultaneously to both channels at one end of the blower box and wherein at least at the opposite end of the blower nozzle box the two channels communicate with each other through an opening in the divider wall.

The size, or rather the flow cross-sectional area of the opening through which the two channels communicate, is easily controlled, for example, by a slide gate. Similarly, the flow cross-sectional areas at the inlet end of at least the channel communicating directly with the nozzle can also be controlled individually or in common by apertured slide gates.

In another embodiment according to the invention the divider wall extends in parallel to an outside longitudinal box wall opposite the wall provided with the nozzle or nozzles, whereby an overflow channel is formed. In this instance the divider wall is provided with throughflow passages or openings at least near the inlet end and near the opposite free end of the nozzle box, whereby the flow openings through the divider wall are distributed over these zones near the inlet and free ends of the box. Further, the two end walls of the box also close the ends of the overflow channel so that treatment medium cannot pass through these end walls and so that any overflow must pass through the overflow openings in the divider wall.

With the aid of the overflow channel according to the invention it has become possible to reduce flow speed variations through the nozzle or nozzles from a range of about ±6%, relative to an average speed, to a range of about ±1.7%. This substantially lower value results practically in a uniform speed distribution along the entire length of the nozzle or box.

This feature of the invention can be installed into nozzle channels of any desired dimensions so that it does not matter how long or how wide the nozzle box is. The geometrical shape of the nozzle box also has no further influence on the installation of the overflow channel, or rather, the divider wall which forms the overflow channel. Further, the present divider wall may be used in so-called nozzle fingers having but one longitudinal slit nozzle and it may also be used in nozzle boxes having a plurality of slit nozzles arranged in parallel to each other and one behind the other as viewed in the moving direction of the web or film to be treatment.

Yet another advantage of the invention is seen in that the divider or partition wall forming the overflow channel can be arranged to extend along any of the longitudinal outer walls of the nozzle channel. It is merely necessary or essential that within the nozzle channel a flow of treatment medium may take place from the blow-in supply end of the nozzle box toward the blow nozzle without being required to pass through an intermediate partition wall. If necessary, the supply inlets at one end of the nozzle channel may be provided with slotted covers. According to the invention the divider wall merely serves with its overflow openings for a localized pressure equalization for equalizing pressure differences that may occur in the main nozzle channel due to different outflow speeds of the treatment medium through the slit nozzle. As a result of such a pressure equalization the flow speeds out of the blowing nozzle or nozzles is also more uniformly distributed.

Differences in the exit speed of the treatment medium jet or jets are most pronounced primarily near the inlet end wall and near the end wall at the free end of the nozzle box. Therefore it is not necessary that the pressure equalization or overflow openings are uniformly distributed over the entire length of the divider wall.

Rather, in certain instances it is satisfactory when the equalization or overflow openings are located only in a zone near the inlet end where the treatment medium is blown into the nozzle channel and in an end zone at the opposite end of the nozzle channel. The intermediate zone of the divider wall between its two perforated zones, then does not have any perforations. The distribution pattern of the equalization apertures and the cross-sectional size and shape of these apertures may differ in each perforated zone.

In another embodiment of the invention which is especially suitable for nozzle boxes having slanted bottom walls, two divider walls extend in parallel to each other and in parallel to the outflow direction of the treatment medium, thereby forming two pressure equalization chambers.

BRIEF DESCRIPTION OF THE DRAWINGS

In order that the invention may be clearly understood, it will now be described, by way of example, with reference to the accompanying drawings, wherein:

FIG. 1 is a simplified longitudinal sectional view through a nozzle or blower box according to the invention;

FIG. 2 is a sectional view along section line 2—2 in FIG. 1;

FIG. 3 is a top plan view of an apertured divider plate that may be used according to the invention;

FIG. 4 is a longitudinal section through a so-called nozzle finger modified according to the invention, and showing a section along section line 4—4 in FIG. 5;

FIG. 5 is a cross-section through the nozzle finger of FIG. 4, along a section line 5—5 in FIG. 4;

FIG. 8 illustrates another embodiment of the invention with two overflow, pressure equalization channels shown as a sectional view along section line 8—8 in FIG. 10;

FIG. 9 is a sectional view along section line 9—9 in FIG. 8; and

FIG. 10 is a sectional view along section line 10—10 in FIG. 8.

Figure 6:
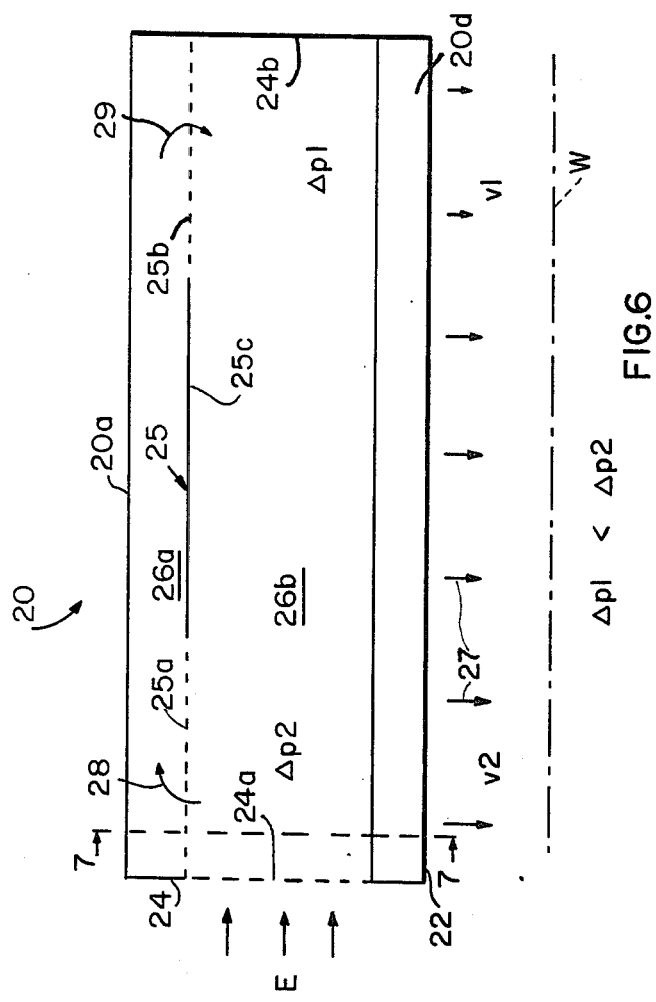
FIG. 6 is a longitudinal section through a nozzle box having a plurality of slit nozzles extending in parallel to each other, whereby the section is taken along section line 6—6 in FIG. 7.

DETAILED DESCRIPTION OF PREFERRED EXAMPLE EMBODIMENTS AND OF THE BEST MODE OF THE INVENTION

FIGS. 1 and 2 show a nozzle box 1 comprising a top wall 1a, two side walls 1b and 1c and a bottom wall 1d as well as end walls 3a and 3b. A longitudinal slit nozzle 2 is formed in the bottom wall 1d. Although the nozzle 2 is shown as a longitudinal slit nozzle, it will be appreciated, that a plurality of individual nozzle slits arranged in a row are also suitable for the present purposes. The blowing jet or jets are indicated by the arrows 2a directed perpendicularly onto the surface of the plastic film material W.

According to the invention the box 1 is separated by a divider wall 4 into a flow control channel 7 and into a nozzle channel 8 extending substantially horizontally and centrally through the box 1 from the end wall 3a almost to the opposite end wall 3b. An opening 9 in the divider wall 4 communicates the upper flow guide channel 7 with the lower blowing channel 8. The divider wall 4 is so located that the flow cross-sectional area of the channel 7 is approximately the same as the flow cross-sectional area of the channel 8. The end wall 3a is provided with inlet openings 7a for the channel 7 and with inlet openings 8a for the channel 8. A gaseous treatment medium indicated by the arrows E is supplied simultaneously to these inlet openings 7a and 8a to provide a treatment flow in both channels as indicated by the arrows 7b and 8b. Due to the opening 9 at the opposite end of the box 1, a flow indicated by the arrow 9a enters into the channel 8 at the opposite end. The size of the opening 9 may be adjusted by a baffle or slide gate 5 which is movable back and forth for example manually by an externally accessible handle 5a. Further, the divider wall 4 may be constructed as an apertured sheet metal as shown at 4' in FIG. 3. Preferably, only the right-hand end of the divider wall 4 is provided with apertures as shown in FIG. 3. Such an apertured end may cooperate with a slide gate 5 movable back and forth as indicated by the arrow 5b. Although the apertures are shown to be round, apertures of any cross-sectional configuration may be used. Thus, the control of the flow quantity into the channel 8 at its right-hand end may be controlled as desired.

The treatment medium indicated by the arrows E flowing into the channels 7 and 8 through the left-hand end wall 3a can also be controlled by operating apertured slide gates 6a and/or 6b up or down as indicated by the arrows 6c and 6d. For this purpose the slide gates 6a and 6b are also accessible from the outside through handles not shown.

In operation, the gates 6a and 6b are so adjusted that both channels 7 and 8 receive the same quantity of treatment medium, thus, the gate 6a would be adjusted to the same position as the gate 6b. As shown, the gate 6a closes the inlet holes 8a and the gate 6b opens the inlet holes 7a. However, these gates 6a and 6b are individually controllable as required. The treatment medium indicated by the arrow 8b can flow directly into the nozzle 2 facing one surface of the web W. Another box just as shown in FIG. 1 may be located below the web W with the nozzle facing upwardly. The treatment medium indicated by the arrow 7b flows through the entire length of the channel 7 until it passes through the opening 9 to enter at the opposite ends into the channel 8.

It has been found that the apparatus according to the invention in which the treatment medium E is introduced at one end of the box 1 into both channels has the same effect as a box in which the treatment medium is introduced at opposite ends into the same channel. Due to the guide channel 7 and the opening 9 the invention assures that the treatment medium flows into the blowing channel 8 from both ends. The static pressure generated inside the blowing channel 8 is converted into dynamic pressure in the nozzle or nozzles 2, whereby a substantially uniform speed through the nozzle 2 is assured. It has been observed that in a small zone near the inlet area, or rather near the end wall 3a, the flow direction of the treatment medium out of the nozzle 2 deviated slightly from the perpendicular direction. The deviation was approximately 10° while the predominant proportion of the treatment medium passed at right angles out of the nozzle or nozzles 2 along the entire length of the blow box 1. The speed distribution of the blowing jet or jets along the length of the box has also been found to be satisfactory. Any deviations have been found to be within a permissible range of about ±2%.

Above, it has been mentioned that the right-hand end of the divider wall 4 could be apertured. However, it is possible to make the entire divider wall as an apertured wall. It has been found that an apertured divider wall improves the speed distribution along the length of the box. Additionally, any deviations from the vertical, or rather perpendicular, blowing direction are also reduced by an apertured divider wall 4. It has been found that the deviation in the vicinity of the end wall 3a from the perpendicular is within the range of about 2° to 3°.

It is further possible to omit the slide gate 6b altogether and provide only the throttling slide gate 6a in the inlet wall 3a of the blowing channel 8. The slide gate 6a may be an apertured plate and it has been found that any deviations of the blowing direction from the vertical can thus also be kept within a permissible limit of about 2° to 3°.

Referring to FIGS. 4 and 5 a so-called nozzle finger 10 comprises longitudinal side walls 10a, 10b, 10c, and 10d. The large end of the nozzle finger 10 or rather, of the housing forming the nozzle finger is closed with an end wall 11a provided with inlet openings 11b for introducing the treatment medium E into the nozzle finger 10. The smaller end or free end is closed by an end wall 11c. The bottom wall 10b has a slit nozzle 12 facing with its opening toward the film or fabric W. A corrugated sheet metal member 13a covers the entrance end of the slit nozzle 12 in the bottom wall 10b near the end wall 11a. Similarly, another corrugated sheet metal member 13b covers the entrance end of the nozzle near the end wall 11c. The slit nozzle 12 may be one continuous slot or it may be formed by a plurality of elongated slots arranged in a row. The type of nozzle used herein is not critical.

As mentioned, the treatment medium E is introduced as indicated by the arrows at the left-hand end of FIG. 4 by a blower not shown. The medium E exits through the nozzle 12 as indicated by the arrows 14 for impinging on the surface of the web W moving in the transport direction T. The arrows 14 and their varying length are intended to show the varying exit speeds of the treatment medium along the length of the nozzle 12. These variations are avoided or at least minimized by the features of the invention as will now be described in more detail below.

According to the invention the housing of the nozzle finger 10 is divided into two chambers 15a and 15b by a divider wall 15 provided with flow openings 15c. The divider wall 15 extends in parallel to one of the longitudinal side walls, preferably the top wall 10a which is slanted as shown so that the cross-sectional flow area of the housing of the nozzle finger 10 decreases from the large end to the small end. The flow openings 15c are preferably evenly distributed over the surface area of the divider wall 15. The chamber 15a forms an overflow and pressure equalization chamber into which treatment medium may flow as indicated by the arrows 15d and out of which treatment medium may flow as indicated by the arrows 15e. Overflow chamber 15a has a first cross-sectional flow area which is substantially constant over the length of the chamber or channel 15a because the wall 10a and the divider wall 15 extend in parallel to each other. The nozzle 12 has a second cross-sectional flow area which is either the cross-sectional flow area of a single nozzle, or the sum total of a plurality of nozzles. All the openings 15c together form a third cross-sectional flow area which, according to the invention, should either be about equal to the second cross-sectional flow area, or slightly larger than the second cross-sectional flow area of the nozzle or nozzles 12 for achieving a desirable speed equalization of the treatment jet along the entire nozzle length.

The divider wall 15 may be a perforated sheet metal member or any other suitably perforated component. In any event, the openings 15c assure a pressure equalization between the chambers 15a and 15b even though the wall 11a completely closes the lefthand end of the chamber 15a so that treatment medium E cannot enter directly through the end wall of the chamber 15a. Similarly, the opposite end of both chambers 15a and 15b is completely closed by the end wall 11c.

The embodiment shown in FIGS. 4 and 5 recognizes the fact that in a container in which there is a uniform static gas pressure throughout the container volume, there is no gas flow until the gas pressure is changed at any random location within the volume of the container. When the pressure is changed, flow will take place from a location of higher pressure toward a location of lower pressure. Due to the insertion of the perforated divider wall 15, the invention provides a static type of overflow channel or chamber 15a which becomes effective in the just mentioned sense.

In operation the treatment medium E entering through the openings 11b passes out through the nozzle 12 and is directed toward the web W as indicated by the arrows 14. The static overflow chamber 15a is separated from the dynamic flow nozzle 12 by the divider wall 15. Locations along the nozzle 12 having a higher jet outflow speed than other locations along the nozzle, cause in the nozzle channel 15b, due to the principle of action-reaction, a higher static pressure than the slower outflow speeds cause at their respective locations. Thus, assuming, for example, that in the nozzle channel 15b there is a location of a differential pressure $\Delta p1$ due to a lower outflow speed as indicated by the arrow 14a as compared to another location with a differential pressure $\Delta p2$ as a result of a larger outflow speed 14b. Due to the throughflow openings 15c, a pressure equalization of these pressure differentials is made possible as indicated by the arrows 15e and 15d. Thus, the overflow channel 15a functions as a pressure equalization and hence as a speed equalization device. The static pressures compensate each other and are then converted into a dynamic pressure in the nozzle 12 which is thus made substantially uniform along the entire length of the nozzle 12, thereby providing a substantially uniform outflow speed along the length of the nozzle.

The installation of an intermediate or divider wall 15 is simple for all types of channels without regard to their size or crosssectional configuration so that the compensation or overflow channel 15a can easily be formed. The geometrical dimensions are also not critical. For example, the spacing between the longitudinal outer wall 10a and the divider wall 15 is not critical. Similarly, the cross-section of the individual flow opening 15c compared to the cross-section of the nozzle opening of the nozzle 12 is also not especially critical so that the designer has a substantial freedom of choice. For example, the flow cross-sectional area of the overflow channel 15a may be constant throughout the length of the channel or chamber 15a. However, the invention is not limited to extending the divider wall 15 in parallel to the top wall 10a. The cross-sectional flow area of the overflow channel may also decrease if desired or required. The compensating effect according to the invention is not diminished by differently locating the divider wall.

Figure 7:
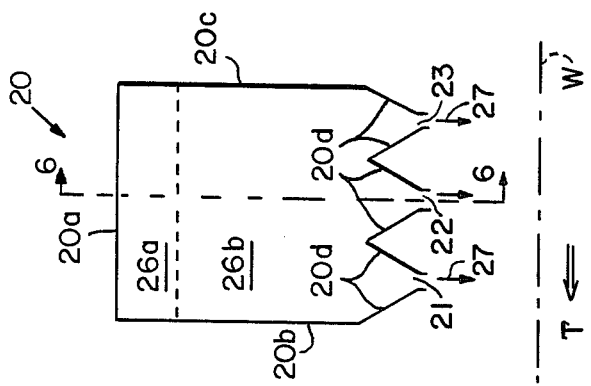
FIG. 7 is a sectional view along section line 7—7 in FIG. 6.

FIGS. 6 and 7 illustrate a further embodiment of the invention showing a so-called blower or nozzle box 20 having the same cross-sectional dimension throughout its length. The box 20 has a top wall 20a, side walls 20b and 20c, and a plurality of slanted bottom walls 20d forming trough type channels leading into three slot nozzles 21, 22, and 23. The inlet end of the box 20 is closed by an end wall 24 having inlets 24a for the treatment medium E. The opposite end of the box 20 is closed by an end wall 24b. A separation wall 25 with perforated zones 25a and 25b again divides the box 20 into an overflow chamber 26a and a nozzle chamber 26b. The treatment medium flows out of all three nozzles as indicated by the arrows 27. However, in the embodiment of FIGS. 6 and 7, three slit nozzles are arranged in parallel and substantially across the travel direction T of the web W. As shown in FIGS. 6 and 7, the nozzle box 20 has a uniform cross-sectional flow area throughout its length, the same applies to the overflow channel or chamber 26a and to the nozzle chamber or channel 26b. The wall 24 closes the overflow channel 26a at its left-end so that treatment medium can flow into the chamber 26a only through the apertures in the zone 25a as indicated by the arrow 28. Similarly, the portion of the treatment medium flowing through the overflow channel or chamber 26a can exit from that chamber only through the apertured zone 25b as indicated by the arrow 29 because the end of the channel 26a is also completely closed by the end wall 24b. Thus, entry of treatment medium E thorugh the wall 24 into the chamber 26a is not possible. Similarly, exit of treatment medium through the wall of 24b is not possible.

The embodiment of FIGS. 6 and 7 is based on the recognition that differences in the exit speed of the treatment medium jet out of the nozzles 21, 22, and 23 along the length of these nozzles occur primarily in zones near the inlet wall 24 and near the end wall 24b. Thus, it is in many instances satisfactory to provide a compensation only in these zones by means of a compensating flow as indicated by the arrows 28 and 29. The zone 25c of the dividing wall 25 remains unperforated.

In FIG. 6 again the different lengths of the arrows 27 indicate different exit speeds along the length of the nozzles. Thus, the speed v2 is larger than the speed v1. Corresponding pressure differentials in the chamber 26b are indicated at $\Delta p2$ and $\Delta p1$. $\Delta p1$ is smaller than $\Delta p2$ in accordance with the mentioned speed condition that v1 is smaller than v2. As a result, a compensating flow 28 passes through the apertured zone 25a into the overflow channel 26a. The compensating flow passes out of the channel 26a through the apertured zone 25b as indicated by the arrow 29. This pressure compensating flow causes in turn a pressure equalization along the length of the nozzles 21, 22, and 23. The axial length of the apertured zones 25a and 25b do not need to be equal to each other. Further, it is not necessary that the sum of all apertures in the zones 25a and 25b is related to the entire nozzle flow cross-sectional area of all three nozzles. Rather, it is sufficient when the total flow cross-sectional area in the zones 25a and 25b is related to the nozzle flow area in respective zones near the walls 24 and 24b. Thus, the respective flow areas may be approximately equal to each other in the beginning and end zones of the nozzle box as influenced by the compensating flow. The total flow area through the zones 25a and 25b may even be slightly larger than the nozzle cross-sectional flow area in the respective beginning and end zones of the box 20. In all instances, the compensation takes place not only in the longitudinal direction of an individual nozzle, but also in the direction across the length of the nozzles, that is, in the direction of the arrow T indicating the travel direction of the web W.

FIGS. 8, 9, and 10 illustrate another embodiment according to the invention. In FIG. 9 the fabric web W shown in dashed lines is seen below the nozzle box 30 which is of the nozzle finger type as disclosed in the above mentioned German Patent (DE-PS) No. 3,007,752. A slanted cover wall 31a forms with side walls 31b and 31c the nozzle box 30 which has slanted bottom walls 31d and 31e forming a slit nozzle 32. Dividing frame members 33 and 34 hold or support a corrugated cover 35 in position above the slit nozzle 32. Due to the corrugation, the treatment medium E is capable to travel toward the nozzle 32. The large end wall 36 has flow openings or inlets 37 for the entry of the treatment medium E. The end wall 38 completely closes the small end of the box 30. The corrugations or waves of the corrugated sheet metal member 35 extend across the length of the box and thus across the length of the slit nozzle 32.

The corrugated cover 35 divides the nozzle box 30 into an upper pressurization chamber 39 and into a lower pressurization chamber 40. A first perforated dividing wall 41 extends substantially vertically between the slanted bottom portion 31d and the inner free edge 34' of the lower frame or separation member 34. A second perforated dividing wall 42 extends substantially vertically between the respective slanted wall member 31e and a corresponding inner free edge 34' of the frame member 34. The two separation walls 41 and 42 extend substantially in parallel to the flow direction of the nozzle 32 and form two compensation channels 43 and 44. Both walls 41 and 42 extend throughout the length of the box 30 and of the nozzle 32. Both overflow channels or chambers 43, 44 have a substantially triangular cross-sectional shape. Here again, it is possible to construct both divider walls 41 and 42 with perforated zones and with unperforated zones. The large end cover wall 36 completely closes the respective ends of the overflow channels 43 and 44. Similarly, the end wall 38 closes the respective end of the chambers 43 and 44, thus treatment medium E cannot flow into the ends of the overflow chambers 43 and 44, nor can it flow out of the other end of these chambers.

FIG. 9 illustrates that the divider wall 41 has a perforated inlet zone 41a, a perforated end zone 41b, and an unperforated zone between the perforated zones. Similarly, the divider wall 42 has an unperforated central zone and perforated end zones 42a and 42b. The assumed pressure differentials $\Delta p1$ and $\Delta p2$ and the respective different outflow speeds v1 and v2 of the treatment medium are shown as indicated. The resulting compensation flow indicated by the arrows 45a, 45b, 45c, and 45d is established when $\Delta p1$ is smaller than $\Delta p2$ and v1 is smaller than v2.

In the embodiment of FIGS. 8, 9, and 10, it is also possible to perforate the divider walls 41 and 42 along their entire length.

Although FIG. 8 shows that the nozzle box 30 is of the so-called nozzle finger type which has a slanting top wall, it is to be understood, that the details of FIGS. 8, 9, and 10 can also be employed in the structure of a nozzle box having a uniform cross-sectional area throughout its length. The requirement regarding the flow cross-sectional area through the apertures in the divider walls 41 and 42 relative to the nozzle cross-sectional flow area remains the same as described above. This applies regardless whether the divider walls 41 and 42 are perforated along their entire length or only in certain inlet and end zones. In any event, the perforations in the divider walls 41 and 42 are preferably uniformly distributed in those areas in which they are provided.

Although the invention has been described with reference to specific example embodiments, it will be appreciated that it is intended to cover all modifications and equivalents within the scope of the appended claims.

What I claim is:

1. An apparatus for blowing a treatment medium onto a web moving in a longitudinal direction, comprising at least one longitudinal treatment medium distribution box arranged substantially across said longitudinal direction, a divider wall separating said box substantially longitudinally into two channels located one next the other, means for supplying treatment medium into said two channels simultaneously at one end of said box, treatment medium discharge nozzle means located in one wall of said box facing said moving web for directing treatment medium jets toward said moving web, and at least one opening in said divider wall at its end opposite said one end of said box, said opening communicating said two channels with each other for directing said treatment medium jets substantially perpendicularly onto a plane defined by said moving web.

2. The apparatus of claim 1, wherein said divider wall comprises an apertured sheet metal member.

3. The apparatus of claim 1, further comprising closure means arranged for closing said opening in said divider wall.

4. The apparatus of claim 3, wherein said closure means comprise a slide gate for adjustably closing said opening in said divider wall.

5. The apparatus of claim 1, further comprising flow cross-sectional area adjustment means arranged at said one end of said box for adjusting the flow quantity of treatment medium into said box.

6. The apparatus of claim 5, wherein said flow cross-sectional adjustment means comprise two separately operable flow cross-sectional area adjustment members, one member being provided for each channel inlet at said one end of said box.

7. The apparatus of claim 5, wherein said flow cross-sectional area adjustment means comprise one adjustment member provided for controlling a treatment medium quantity flowing into said one channel facing said moving web.

8. An apparatus for blowing a treatment medium onto a web moving in a longitudinal direction, comprising at least one longitudinal treatment medium distribution box arranged substantially across said longitudinal direction, said distribution box having longitudinal walls and end walls, divider wall means separating said box substantially longitudinally into a nozzle channel and into at least one overflow channel which receives treatment medium from said nozzle channel, treatment medium discharge nozzle means for directing at least one treatment medium jet onto said moving web through a bottom wall member of said longitudinal walls, treatment medium supply means at one end wall of said box for blowing treatment medium into said nozzle channel at one end of said nozzle channel, said divider wall means comprising overflow openings distributed at least in zones near said end walls of said box, said end walls of said box also closing ends of said overflow channel for preventing flow of treatment medium through said end walls, said apparatus further comprising lateral support means inside said box, a corrugated cover member held by said support means for partitioning said nozzle channel into a first pressurized chamber and into a second pressurized chamber, said treatment medium discharge nozzle means extending longitudinally in said bottom wall member of said longitudinal walls, said nozzle means facing said corrugated cover member, said bottom wall member comprising bottom wall sections extending at a slant relative to a jet flow direction out of said nozzle means, said divider wall means extending from said support means to said bottom wall member for forming at least one overflow channel.

9. The apparatus of claim 8, wherein said overflow openings in said divider wall means are provided throughout the length of said divider wall means.

10. The apparatus of claim 8, wherein said treatment medium discharge nozzle means comprise a plurality of longitudinal slit nozzles arranged in parallel to each other and substantially across said longitudinal moving direction.

11. The apparatus of claim 8, wherein said divided wall means comprise two divider wall members extending from a respective inner free edge of said support means to a respective one of said bottom wall sections for forming two overflow channels, whereby both overflow channels have a substantially triangular cross-section.

12. The apparatus of claim 8, wherein said distribution box has a cross-sectional area which becomes smaller from said one end wall where said treatment medium supply means are located, to the other end wall.

13. The apparatus of claim 8, wherein said treatment medium discharge nozzle means comprise at least one slit nozzle extending longitudinally between two of said bottom wall sections.

14. The apparatus of claim 8, wherein said divider wall means extend substantially vertically.

15. The apparatus of claim 8, wherein said treatment medium discharge nozzle means comprise at least one slit nozzle extending substantially across said longitudinal moving direction.

16. The apparatus of claim 15, wherein said treatment medium distribution box forms a so-called nozzle finger having a wider cross-section at one end than at the other end.

17. The apparatus of claim 8, wherein said divider wall means extends substantially in parallel to a top wall member of said longitudinal walls of said overflow channel has a substantially constant first flow cross-sectional area throughout its length.

18. The apparatus of claim 17, wherein said top wall member and said divider wall means extending in parallel to each other, extend at a slant relative to said bottom wall member of said longitudinal walls.

19. The apparatus of claim 17, wherein said treatment medium discharge nozzle means have a given second flow cross-sectional nozzle area, all of said flow openings in said divider wall means defining together a third flow cross-sectional area, said third flow cross-sectional area being equal to or larger than said second flow cross-sectional nozzle area.

* * * * *

UNITED STATES PATENT AND TRADEMARK OFFICE
CERTIFICATE OF CORRECTION

PATENT NO. : 4,779,357

DATED : October 25, 1988

INVENTOR(S) : Gerhard Troetscher

It is certified that error appears in the above-identified patent and that said Letters Patent is hereby corrected as shown below:

Please replace [57] ABSTRACT text to read as follows:

--Onto the surface of a material web being moved in its longitudinal direction, a gaseous treatment medium is applied by a nozzle box or a nozzle finger arranged across the material web. The nozzle box thereby has at least one blow nozzle arrangement directed onto the material web. The nozzle box is divided in its longitudinal direction by an elongated separation wall into a channel containing the nozzles and into a second channel extending in parallel thereto. In a first embodiment treatment medium is supplied to both channels from the same side. Thereby the separation wall has at least one opening through which the two channels communicate at the other end of the nozzle box. By this arrangement such a distribution of the treatment medium in the channel containing the nozzles is achieved as if the treatment medium is supplied simultaneously to both sides of the channel. For another embodiment the second channel is closed for a direct supply of the treatment medium and the separation wall contains at least in a beginning zone and in an end zone compensating openings. Thereby the second channel forms an overflow channel and makes possible a compensation of pressure differences or different blow-out speeds of the medium along the nozzle channel. The nozzle box may also be subdivided into two overflow channels and a common nozzle channel, whereby two separation walls are arranged substantially vertically, for forming two overflow channels of triangular cross-section.--.

UNITED STATES PATENT AND TRADEMARK OFFICE
CERTIFICATE OF CORRECTION

PATENT NO. : 4,779,357

DATED : October 25, 1988

INVENTOR(S) : Gerhard Troetscher

It is certified that error appears in the above-identified patent and that said Letters Patent is hereby corrected as shown below:

Column 12, line 54, claim 17, line 3, before "overflow" insert

-- box so that said --.

Signed and Sealed this

Fourteenth Day of March, 1989

Attest:

DONALD J. QUIGG

*Attesting Officer*  *Commissioner of Patents and Trademarks*